_United States Patent_ [19]

Flournoy et al.

[11] 4,162,989

[45] Jul. 31, 1979

[54] OIL-IN-WATER EMULSION

[75] Inventors: Kenoth H. Flournoy, Levelland; Ricardo L. Cardenas; Joseph T. Carlin, both of Houston, all of Tex.

[73] Assignee: Texaco Inc., White Plains, N.Y.

[21] Appl. No.: 827,296

[22] Filed: Aug. 24, 1977

Related U.S. Application Data

[62] Division of Ser. No. 664,712, Mar. 8, 1976, Pat. No. 4,108,193.

[51] Int. Cl.² ........................... F17D 1/17; B01J 13/00
[52] U.S. Cl. ..................................... 252/312; 137/13; 252/352; 252/355
[58] Field of Search .............. 252/312, 8.55 R, 8.55 D; 137/13; 252/352

[56] References Cited

U.S. PATENT DOCUMENTS

| | | | |
|---|---|---|---|
| 2,535,677 | 12/1950 | Hollander et al. | 260/513 |
| 3,467,195 | 9/1969 | McAuliffe et al. | 252/8.55 X |
| 3,487,844 | 1/1970 | Simon | 137/13 |
| 3,827,497 | 8/1974 | Dycus et al. | 252/8.55 X |
| 3,943,954 | 3/1976 | Flournoy et al. | 252/312 X |
| 3,977,471 | 8/1976 | Gale et al. | 252/8.55 X |

_Primary Examiner_—Herbert B. Guynn
_Attorney, Agent, or Firm_—Carl G. Ries; Thomas H. Whaley; Walter D. Hunter

[57] ABSTRACT

A method for transporting viscous hydrocarbons which involves introducing into a pipeline or well-bore with the viscous hydrocarbons a solution containing (1) an anionic surfactant such as sodium tridecyl sulfate, sodium oleate, etc., or an oxyalkylated anionic surfactant of the sulfonate or sulfate type, and mixtures of the surfactants mentioned and (2) an alkalinity agent such as sodium hydroxide, thereby forming a low viscosity, salt-tolerant, oil-in-water emulsion. Optionally, the solution may contain a small amount of a guanidine salt or a water-soluble oxyalkylated, nitrogen-containing aromatic compound such as ethoxylated-8-hydroxy quinoline.

4 Claims, No Drawings

OIL-IN-WATER EMULSION

This is a division of application Ser. No. 664,712, filed Mar. 8, 1976 now U.S. Pat. No. 4,108,193.

BACKGROUND OF THE INVENTION

1. Field of the Invention

This invention relates to an improved method for transporting hydrocarbons thru a pipeline or well-bore. More particularly, this invention relates to the introduction into a pipeline of a viscous hydrocarbon or mixture of hydrocarbons together with an aqueous solution of an anionic surfactant and an alkalinity agent whereby a low viscosity, salt-tolerant oil-in-water emulsion is formed which facilitates movement of the hydrocarbon in the pipeline. Optionally, the solution may contain a guanidine salt or an oxyalkylated, nitrogen-containing aromatic compound to aid in the formation of salt-tolerant oil-in-water emulsion.

2. Description of the Prior Art

The transportation of heavy crudes by pipeline is difficult because of their low mobility and high viscosity. The usual methods to facilitate the flow of heavy crudes have included cutting them with lighter fractions of hydrocarbons. However, the procedures involve the use of relatively large amounts of expensive hydrocarbon solvents to transport a relatively cheap product. The practice also necessarily requires the availability of the cutting hydrocarbon solvents which, in some instances is inconvenient.

Another method to assist the flow of hydrocarbons in pipeline is the installation of heating equipment at frequent intervals along the pipeline, whereby the crude is heated to reduce its viscosity and thereby facilitate its transport.

Heaters employed for this purpose can be operated by withdrawing some of the crude being transported for use as fuel. However, this procedure may result in the loss of as much as 15 to 20% of the crude being transported.

Other methods to facilitate transport of heavy crudes have employed thermal viscosity breaking, which, however, produces substantial amounts of gas.

It is known that substantial amounts of water may be introduced into a pipeline containing a stream of viscous crude flowing therethru to reduce the drag on the stream and thus facilitate the flow thru the pipeline. This has been done by the addition of water together with crude into the pipeline such that a water-in-oil emulsion is formed.

It is thus an object of the present invention to provide a transport method for viscous crudes which are difficult to emulsify especially in the presence of water with substantial salt content whereby they can be more easily transported by pipeline at a high thru-put rate.

SUMMARY OF THE INVENTION

This invention relates to a method for transporting viscous hydrocarbons such as crude oil in which the hydrocarbon together with an aqueous solution of an anionic surfactant or a mixture of anionic surfactants and an alkalinity agent and, optionally, a guanidine salt or an oxyalkylated, nitrogen-containing aromatic compound, is introduced into the pipeline with mixing. During the mixing operation an oil-in-water emulsion is formed which is stable in hard water and salt tolerant.

DESCRIPTION OF THE INVENTION

As previously pointed out this invention is concerned with a method of transportation via pipeline of viscous oils in an oil-in-water emulsion wherein the water phase is formed using highly saline and/or hard water, e.g., water-containing appreciable quantities of sodium chloride and/or water soluble salts or divalent cations such as calcium or magnesium.

In this invention the aqueous solution added to the viscous hydrocarbon will generally range from a minimum of about 10 percent by volume based on the volume of the hydrocarbon introduced into the pipeline up to a maximum of about 40 percent or more by volume with the preferred amount being about 20 to about 30 percent by volume on the same basis. In the aqueous solution the concentration of the anionic surfactant will range from about 0.01 to about 2.0 weight percent and the alkalinity agent from about 0.01 to about 1.0 weight percent. Optionally, the aqueous solution can contain from about 0.01 to about 0.50 weight percent of a material selected from the group consisting of (a) guanidine salts, (b) oxyalkylated, nitrogen-containing aromatic compounds and (c) mixtures of (a) and (b) above.

A particularly useful class of anionic surfactants comprises compounds selected from the group consisting of water soluble salts of alkyl sulfates having from 6 to 20 carbon atoms and water soluble salts of unsaturated aliphatic carboxylic monobasic acids having from 6 to 20 carbon atoms.

Anionic surfactants suitable for use in the aqueous solution used in this invention include, for example, compounds of the formula:

wherein d and e are integers and the sum of d+e is from 2 to 16 and M is selected from the group consisting of monovalent ions as exemplified by $Na^+$, $K^+$, $Li^+$, $NH_4^+$, etc. An example of materials of this type include sodium oleate, etc.

Another class of compounds which may be employed as the anionic surfactant in the present invention have the general formula:

wherein f is an integer of from 5 to 19 and M is a monovalent cation such as $Na^+$, $K^+$, $Li^+$, $NH_4^+$, etc. Examples of compounds of this type include sodium dodecyl sulfate, potassium cetyl sulfate, sodium decyl sulfate, sodium tetradecyl sulfate, etc.

Another group of anionic surfactants suitable for use in this invention include sulfate compounds of the formula:

wherein R is selected from the group consisting of alkyl of from 8 to 25 carbon atoms and

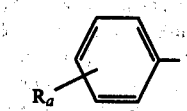

wherein $R_a$ is alkyl of from 8 to 20 carbon atoms, g is an integer of from 1 to about 20 and M is a metallic cation such as sodium, potassium, lithium or the ammonium ion. For example, sodium tridecyl-polyoxyethylene sulfate and potassium nonylphenol polyoxyethylene sulfate are preferred sulfate type-surfactants of this class.

A third group of anionic oxyalkylated surfactants which are especially useful in the process of this invention include sulfonate compounds of the formula:

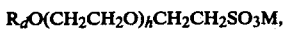

wherein $R_d$ is selected from the group consisting of alkyl of from 8 to 20 carbon atoms;

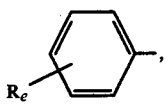

where $R_e$ is alkyl of from 8 to 20 carbon atoms and

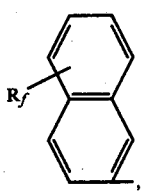

where $R_f$ is alkyl of from 1 to 10 carbon atoms; h is an integer of from 1 to 24 and M is a metallic cation such as sodium, potassium, lithium or the ammonium ion.

Another group of anionic surfactants which are suitable for use in the process of this invention include block-type sulfonate compounds of the formula:

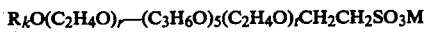

wherein $R_k$ is selected from the group consisting of alkyl of from 8 to 20 carbon atoms

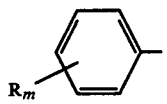

wherein $R_m$ is alkyl of from 8 to 20 carbon atoms and

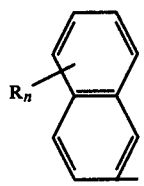

wherein $R_n$ is alkyl of from 1 to 10 carbon atoms; r is an integer of from 1 to about 18, s is an integer of from 1 to about 12, t is an integer of from 1 to about 20 and the sum of r+s+t is not more than 30, wherein at least 60 percent of the oxyalkylene units are oxyethylene units and M is a metallic cation selected from the group consisting of sodium, potassium, lithium or an ammonium ion.

Block-type sulfonate surfactants as described above may be prepared by first condensing ethylene oxide with a suitable initiator in the presence of, for example, about 0.12 weight percent of sodium hydroxide in a stirred autoclave maintained at 95°–100° C. After devolatizing the resulting product to remove low boiling products, if desired, a second condensation reaction is conducted with propylene oxide under the same conditions and finally a third condensation is conducted with ethylene oxide. After the block type oxyalkylated precursor has been prepared it is reacted with sulfurous oxychloride (i.e., $SOCl_2$) to replace the terminal hydroxyl group with chlorine and this intermediate may then be reacted with sodium sulfite to form the desired sulfonate. This sulfonation reaction is below where the purposes of illustration the sulfonation of polyethoxylated alkylphenol is set forth:

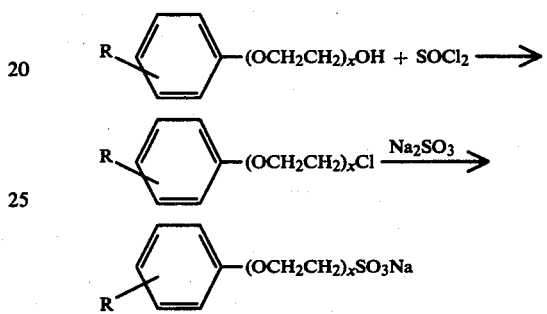

These same sulfonates can also be prepared by first forming the corresponding sulfate salt and then reacting the sulfate salt with sodium sulfite. This last-mentioned reaction is considered less deisrable than the $SOCl_2$—$Na_2SO_3$ method since drastic reaction conditions must be employed to force the sulfate reaction to completion.

The alkalinity agent which can be selected from the group consisting of sodium hydroxide, potassium hydroxide and lithium hydroxide will range in concentration from about 0.01 to about 1.0 weight percent, when employed.

Guanidine salts useful in preparing the aqueous solution employed in this invention include guanidine hydrochloride, guanidine acetate, guanidine sulfate, guanidine carbonate, guanidine thiocyanate, guanidine nitrate, etc. and mixtures thereof.

An especially useful group of the water-soluble, oxyalkylated, nitrogen-containing aromatic compounds of the formula:

wherein $R_v$ is selected from the group consisting of:

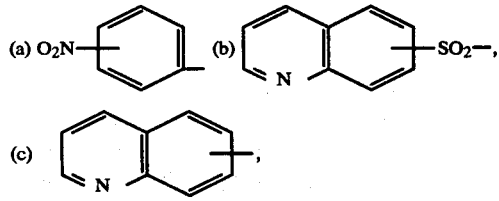

wherein $R_w$ is alkylene of from two to four inclusive carbon atoms and x is an integer of from about 5 to about 50 and, preferably, from about 5 to about 20.

The novel water-soluble oxyalkylated products of this invention can be conveniently prepared by a number of processes well-known in the art. For example, the alkylene oxide can be reacted with the initiator dissolved in a suitable solvent throughout which an alkaline catalyst, such as potassium hydroxide or sodium hydroxide, is uniformly dispersed. The quantity of the catalyst utilized generally will be from about 0.15 to about 0.1 percent by weight of the reactants. Preferably, the reaction temperature will range from about 80° C. to about 180° C., while the reaction time will be from about 1 to about 20 hours or more depending on the particularly reaction conditions. This process is described in U.S. Pat. No. 2,425,845. The preparation of such oxyalkylated, nitrogen-containing aromatic compounds such as exemplified by ethoxylated 8-hyroxyquinoline, propoxylated nitrophenol, ethoxylated 8-quinoline sulfonic acid, etc. is more completely described in U.S. Pat. No. 3,731,741 which is incorporated herein by reference in its entirety.

In other aspects this invention relates to oil-in-water emulsions comprising a hydrocarbon such as crude oil including heavy crude oil, fuel oil, propane, propane-butane mixtures such as LPG, etc. and as the aqueous phase an aqueous solution comprising about 0.01 to about 2.0 weight percent of an anionic surfactant or a mixture of anionic surfactants of the types previously referred to and from about 0.01 to about 1.0 weight percent of an alkalinity agent such as sodium hydroxide, potassium hydroxide, etc.

Useful oxyalkylated, nitrogen-containing aromatic compounds include, for example:

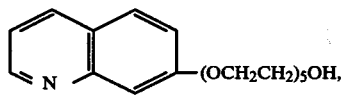

The amount of the aqueous solution added to the hydrocarbon to prepare the oil-in-water emulsions will generally range as set out above of from a minimum of about 10 percent by volume based on the volume of the hydrocarbon up to a maximum of about 40 percent or more by volume with the preferred amount being about 20 to about 30 percent by volume on the same basis. Optionally, the aqueous solution may contain from about 0.01 to about 0.50 weight percent of a material selected from the group consisting of (a) guanidine salts (b) oxyalkylated, nitrogen-containing aromatic compounds and (c) mixtures of (a) and (b).

In another embodiment of this invention relates to the above described aqueous solutions employed to prepare the oil-in-water emulsions previously described.

The following examples illustrate various embodiments of this invention and are to be considered not limitative.

EXAMPLE I

An aqueous solution containing 0.5 weight percent of sodium dodecyl sulfate, 0.4 weight percent of a sulfonate surfactant having the formula:

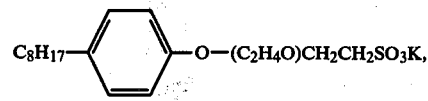

0.10 weight percent of guanidine hydrochloride, and about 0.10 weight percent of sodium hydroxide was prepared by adding with mixing the above-mentioned ingredients to water having a salinity of about 2.03 weight percent at a temperature of about 24° C. after which the thus-prepared solution is introduced with mixing into a large diameter pipeline together with sufficient heavy California crude oil, to give an oil-in-water emulsion in which the amount of aqueous solution is about 20 percent by volume based on the volume of crude. The horsepower requirement for transporting the formed oil-in-water emulsion through the pipeline at the rate of 1,400 barrels per day is found to be substantially less than the horsepower requirement for transporting the same volume of the heavy California crude under the same conditions.

EXAMPLE II

An aqueous solution comprising about 0.7 weight percent of a sulfonate surfactant having the formula:

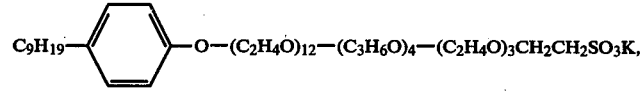

0.12 weight percent of the compound:

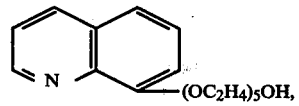

and about 0.10 weight percent potassium hydroxide is formed by mixing together at a temperature of about 25° C. the above-named ingredients with brine having a salinity of about 1.64 weight percent. The thus-formed aqueous solution is introduced into a pipeline together with Hewitt crude, Carter County, Oklahoma to give an oil-in-water emulsion in which the volume percent of the aqueous solution based on the volume of the crude is about 27 percent. An appreciable saving in horsepower requirement for pumping 2,400 barrels/day of the emulsion through the pipeline over the requirement for the same amount of Hewitt crude under the same condition is achieved.

What is claimed is:

1. An oil-in-water emulsion comprising a hydrocarbon phase and as the aqueous phase about 10 percent to about 40 percent by volume based on the volume of the hydrocarbon of an aqueous solution comprising from about 0.01 to about 2.0 weight percent of an anionic surfactant selected from the group consisting of:

(A) compounds of the formula:

wherein R is selected from the group consisting of alkyl of from 8 to 25 carbon atoms and

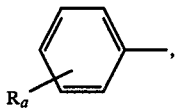

wherein $R_a$ is alkyl of from 8 to 20 carbon atoms, g is an integer of from 1 to about 20 and M is a monovalent cation selected from the group consisting of sodium, potassium, lithium and the ammonium ion;

(B) sulfonates of the formula:

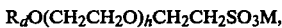

wherein $R_d$ is selected from the group consisting of alkyl of from 8 to 20 carbon atoms;

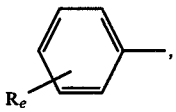

wherein $R_e$ is alkyl of from 8 to 20 carbon atoms and

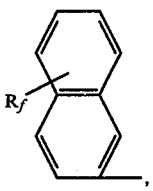

wherein $R_f$ is alkyl of from 1 to 10 carbon atoms; h is an integer of from 1 to 24 and M has the same meaning as described above in (A);

(C) sulfonates of the formula:

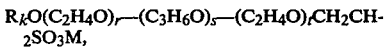

wherein $R_k$ is selected from the group consisting of alkyl of from 8 to 20 carbon atoms;

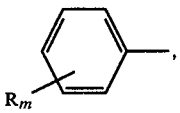

wherein $R_m$ is alkyl of from 8 to 20 carbon atoms, and

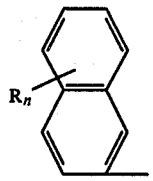

wherein $R_n$ is alkyl of from 1 to 10 carbon atoms; r is an integer of from 1 to about 18; s is an integer of from 1 to about 12, t is an integer of from 1 to about 20, and the sum of r+s+t is not more than 30, wherein at least 60 percent of the oxyalkylene units are oxyethylene units and wherein M has the same meaning as described in (A) above; and (D) mixtures of the above described surfactants; from about 0.01 to about 1.0 weight percent of an alkalinity agent selected from the group consisting of sodium hydroxide, potassium hydroxide, lithium hydroxide and mixtures thereof and from about 0.01 to about 0.50 weight percent of a material selected from the group consisting of (1) a guanidine salt, (2) an oxyalkylated nitrogen-containing aromatic compound having the formula:

wherein $R_y$ is selected from the group consisting of:

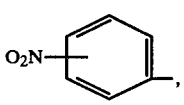

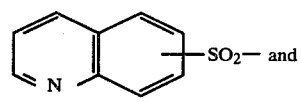

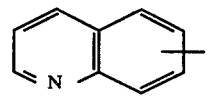

wherein $R_w$ is alkylene of from 2 to 4 inclusive carbon atoms and x is an integer of from about 5 to about 50 and (3) mixture of (1) and (2) above.

2. The emulsion of claim 1 wherein the said surfactant is a sulfonate of the formula:

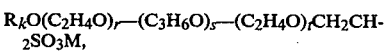

wherein $R_k$ is selected from the group consisting of alkyl of from 8 to 20 carbon atoms;

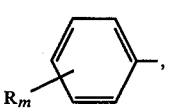

wherein $R_m$ is alkyl of from 8 to 20 carbon atoms, and

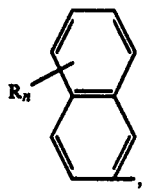

wherein $R_n$ is alkyl of from 1 to 10 carbon atoms; r is an integer of from 1 to about 18; s is an integer of from 1 to about 12; t is an integer of from 1 to about 20, and the sum of $r+s+t$ is not more than 30, wherein at least 60 percent of the oxyalkylene units are oxyethylene units and wherein M is a monovalent cation selected from the group consisting of sodium, potassium, lithium and the ammonium ion.

3. The emulsion of claim 1 wherein the said surfactant is a sulfonate of the formula:

$$R_dO(CH_2CH_2O)_hCH_2CH_2SO_3M,$$

wherein $R_d$ is selected from the group consisting of alkyl of from 8 to 20 carbon atoms;

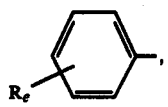

wherein $R_e$ is alkyl of from 8 to 20 carbon atoms and

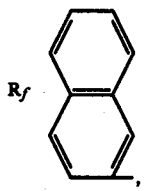

wherein $R_f$ is alkyl of from 1 to 10 carbon atoms; h is an integer of from 1 to 24 and M is a monovalent cation selected from the group consisting of sodium, potassium, lithium and the ammonium ion.

4. The emulsion of claim 1 wherein the said hydrocarbon is crude oil.

* * * * *